(12) United States Patent
Beygelzimer et al.

(10) Patent No.: US 6,615,211 B2
(45) Date of Patent: Sep. 2, 2003

(54) SYSTEM AND METHODS FOR USING CONTINUOUS OPTIMIZATION FOR ORDERING CATEGORICAL DATA SETS

(75) Inventors: Alina Beygelzimer, Rochester, NY (US); Chang-shing Perng, Bedford Hills, NY (US); Sheng Ma, Briarcliff Manor, NY (US); Joseph L. Hellerstein, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 09/812,250

(22) Filed: Mar. 19, 2001

(65) Prior Publication Data

US 2002/0161736 A1 Oct. 31, 2002

(51) Int. Cl.$^7$ .............................................. G06F 17/30
(52) U.S. Cl. ........................................................ 707/6
(58) Field of Search ............................................ 707/6

(56) References Cited

U.S. PATENT DOCUMENTS

| | | | | | |
|---|---|---|---|---|---|
| 5,696,907 A | * | 12/1997 | Tom | ............................ | 705/38 |
| 5,861,891 A | * | 1/1999 | Becker | ........................ | 345/619 |
| 5,946,692 A | * | 8/1999 | Faloutsos et al. | ............ | 707/101 |
| 6,034,697 A | * | 3/2000 | Becker | ........................ | 345/606 |
| 6,052,662 A | * | 4/2000 | Hogden | ........................ | 704/256 |
| 6,178,382 B1 | * | 1/2001 | Roederer et al. | .............. | 702/21 |
| 6,243,615 B1 | * | 6/2001 | Neway et al. | ............... | 700/108 |
| 6,247,016 B1 | * | 6/2001 | Rastogi et al. | ............... | 707/101 |
| 6,295,514 B1 | * | 9/2001 | Agrafiotis et al. | ............. | 703/12 |
| 6,356,899 B1 | * | 3/2002 | Chakrabarti et al. | ............ | 707/5 |
| 6,421,668 B1 | * | 7/2002 | Yakhini et al. | ................. | 707/6 |
| 6,487,539 B1 | * | 11/2002 | Aggarwal et al. | ............. | 705/14 |
| 2002/0023256 A1 | * | 2/2002 | Seawright | .................... | 716/18 |
| 2002/0077756 A1 | * | 6/2002 | Arouh et al. | .................. | 702/20 |

OTHER PUBLICATIONS

U.S. patent application Ser. No. 09/422,708, S. Ma et al., filed Oct. 21, 1999, "Systems and Methods for Ordering Categorical Attributes to Better Visualize Multidimensional Data".

U.S. patent application Ser. No. 09/359,874, J.L. Hellerstein et al., filed Jul. 27, 1999, "Systems and Methods for Exploratory Analysis of Data for Event Management".

S. Ma et al., "Ordering Categorical Data to Improve Visualization," Proceedings of the IEEE Symposium on Information Visualization, pp. 1–4, Oct. 1999.

S. Ma et al., "EventBrowser: A Flexible Tool for Scalable Analysis of Event Data" DSOM pp. 1–10, Oct. 1999.

M.O. Ward, "XmdvTool: Integrating Multiple Methods for Visualizing Multivariate Data," Proceedings of the Conference on Visualization (Los Alamitos, CA, USA) IEEE Computer Society Press, 9 pages, Oct. 1994.

V. Ganti et al., "CACTUS—Clustering Categorical Data Using Summaries," Proceedings of the Fifth ACM SIGKDD International Conference on Knowledge Discovery and Data Mining, ACM Press, 11 pages, Aug. 1999.

D. Gibson et al., "Clustering Categorical Data: An Approach Based on Dynamical Systems," Proceedings of the 24th International Conference on Very Large Data Bases, VLDB, 12 pages, Aug. 1998.

(List continued on next page.)

*Primary Examiner*—Wayne Amsbury
(74) *Attorney, Agent, or Firm*—Gail H. Zarick; Ryan, Mason & Lewis, LLP

(57) ABSTRACT

Techniques for ordering categorical attributes so as to better visualize data are provided. In accordance with one embodiment of the invention, an ordering algorithm comprises the steps of: (a) translating the discrete ordering problem to a continuous optimization problem; (b) solving the continuous optimization problem; and (c) mapping an optimal continuous solution to the closest discrete solution.

30 Claims, 6 Drawing Sheets

OTHER PUBLICATIONS

S. Guha et al, "Rock: A Robust Clustering Algorithm for Categorical Attributes," Proc. of the 15th Int. Conf. on Data Eng., 10 pages, 1999.

C. Faloutsos et al., "FastMap: A Fast Algorithm for Indexing, Data–Mining and Visualization of Traditional and Multimedia Datasets," Proceedings of the 1995 ACM SIGMOD International Conference on Management of Data (San Jose, California) pp. 1–25, May 1995.

W.E. Donath et al., "Algorithms for Partitioning of Graphs and Computer Logic Based on Eigenvectors of Connection Matrices," IBM Technical Disclosure Bulletin, vol. 15 (1972), No. 3, pp. 938–944.

M. Fiedler, "Algebraic Connectivity of Graphs," Czechoslovak Mathematical Journal, 23 (1973), No. 98, pp. 298–305.

K.M. Hall, "An r–Dimensional Quadratic Placement Algorithm," Management Science, vol. 17, (1970), No. 3, pp. 219–229.

G. Karypis et al., "Multilevel Hypergraph Partitioning: Applications in VLSI Domain," Tech. report, University of Minnesota, Department of Computer Science, 1997, short version in 34th Design Automation Conference, pp. 1–25.

\* cited by examiner

SYSTEM AND METHODS FOR USING CONTINUOUS OPTIMIZATION FOR ORDERING CATEGORICAL DATA SETS

FIELD OF THE INVENTION

The present invention generally relates to data exploration and analysis techniques and, in particular, to systems and methods for ordering and visualizing categorical data for use in such data exploration and analysis techniques.

BACKGROUND OF THE INVENTION

Visual representation has become increasingly important in conveying and interpreting information from a large amount of data. This is because it is known that human visual perception is remarkably good at identifying interesting patterns and spatial relationships. Good, effective visual representation can present information in a way that maximally exploits our visual skills so as to reveal interesting trends and anomalies hidden in data. A large number of data attributes in real data sets are categorical. A categorical value conveys the category of an object. There is typically neither a natural order nor distances associated with categorical values. For example, consider a data set representing a temporal sequence of events with such attributes as host name, event name, event severity. Although we can arguably define a meaningful order of event severity, there is no natural way of defining distances and an order of host names and event names.

While considerable research has been done on visualizing numerical data by directly leveraging its inherent geometric properties in constructing a visualization, there has been much less work on visualizing and extracting a structure in categorical data. Clearly, the lack of an order of attribute values adds additional complexity. This is because there are exponentially many ways in which the categorical values can be totally ordered. However, it is unlikely that all such orders produce equally effective visualizations. Ma and Hellerstein identified the problem and showed that the quality of the ordering algorithm is crucial for effectively visualizing categorical data, see U.S. patent application identified by Ser. No. 09/422,708, filed on Oct. 21, 1999 in the names of S. Ma and J. L. Hellerstein and entitled "Systems and Methods for Ordering Categorical Attributes to Better Visualize Multidimensional Data,"; S. Ma and J. L. Hellerstein, "Ordering categorical data to improve visualization," Proceedings of the IEEE Symposium on Information Visualization, 1999; and S. Ma and J. L. Hellerstein, "EventBrowser: exploratory analysis of event data for event management," DSOM 1999, the disclosures of which are incorporated by reference herein.

To illustrate the importance of ordering categorical values, we consider the same data set as used by Ma and Hellerstein in the above-referenced disclosures. The data set contains over 10,000 events generated by 160 hosts with 20 event types over a three-day period. FIG. 1 shows a scatter plot of the data set, in which the x-axis and the y-axis represent the time and the host name (e.g., an identifier (id) of a host in a network of computing devices) of an event, respectively. In this plot, since host names are categorical, they must somehow be mapped to geometric coordinates (on the y-axis). The order of host names in FIG. 1 is a random permutation of host names. Unfortunately, the scatter plot of FIG. 1 produces results that are not particularly revealing because of the random ordering scheme. Thus, it is evident that some better ordering or mapping is required to provide a higher quality visualization of the data set.

A key issue addressed by Ma and Hellerstein in the above-referenced disclosures, which is also a focus of the present invention, is how to find a mapping that results in an effective visualization. Clearly, a guiding principle behind the construction of such a mapping is to utilize the geometric proximity to capture relationships between objects. That is, we want similar, related objects to be placed close to each other.

Numerous research efforts and commercial products have applied visualization techniques to categorical data sets, e.g., M. O. Ward, "XmdvTool: Integrating multiple methods for visualizing multivariate data," Proceedings of the Conference on Visualization (Los Alamitos, Calif., USA) IEEE Computer Society Press, pp. 326–336, October 1994; Diamond software from IBM Corporation; and U.S. patent application identified by Ser. No. 09/359,874, filed on July 27, 1999, and entitled "Systems and Methods for Exploratory Analysis of Data for Event Management," the disclosures of which are incorporated by reference herein. Such efforts can be classified into four classes.

One simple approach is to order categorical values based on an auxiliary numerical attribute or to order the values alphabetically. In our previous example, we can order host names by the time of their first occurrence in the data set. This approach is based on the assumption that there is some causality in the order of events generated by a system. However, this approach is not related to a visual task, and thus can not, in general, provide the best visualization quality. The performance associated with this approach gets worse as the size and the complexity of the data set grows.

The second class is mostly focused on clustering-based approaches, see, e.g., V. Ganti et al., "CACTUS: Clustering categorical data using summaries," Proceedings of the Fifth ACM SIGKDD International Conference on Knowledge Discovery and Data Mining, ACM Press, pp. 73–83, August 1999; D. Gibson et al., "Clustering categorical data: An approach based on dynamic systems," Proceedings of the 24th International Conference on Very Large Data Bases, VLDB, pp. 311–322, August 1998; S. Guha et al, "Rock: a robust clustering algorithm for categorical attributes," Proc. of the 15th Int. Conf. on Data Eng., 1999; and S. Ma and J. L. Hellerstein, "Ordering categorical data to improve visualization," Proceedings of the IEEE Symposium on Information Visualization, 1999, the disclosures of which are incorporated by reference herein.

Clustering is a natural way of getting an insight into the data set. However, three issues effect its value for visualization purposes. First, although clusters can be identified in the geometric space, cluster descriptions are still unordered, and some additional nontrivial methods are needed to order and visualize the clusters, and to order and visualize the elements within each cluster. Second, most clustering algorithms prefer certain, usually very structured cluster shapes (e.g., rectangular regions of the above-referenced CACTUS approach), and always tend to partition the data into clusters of such shapes even though there may be no clustering tendency in the data set at all. In particular, the CACTUS approach showed that the above-referenced Gibson approach is not able to discover several natural classes of clusters, such as clusters with overlapping projections on some subset of attributes. We feel that making any assumption about the clustering structure of the data defeats the whole purpose of using clustering algorithms to extract structures. The present invention is directed toward techniques for revealing the order without imposing any prior assumption on the data. To do so, the present invention formulates the problem using an optimization framework.

Related to the second class of algorithms, the third approach proposed in the above-referenced U.S. patent application identified by Ser. No. 09/359,874, is based on hierarchical ordering. The approach provides for iteratively grouping the closest pair of points (in respect to some similarity function) and replaces the pair by a single point. The points are thus fashioned into a strict hierarchy of nested ordered subsets. The length of the shortest path between any two subsets corresponds to the degree of their similarity. Constructing a global ordering reduces to locally ordering pairs of subsets recursively in a bottom-up fashion. In this approach, a strict hierarchical tree can not reflect the multiple different ways in which points can be related, and this situation gets more severe as the size and the complexity of the data grow. Second, the hierarchical ordering is deterministic in nature (once the points are grouped together, there is no opportunity to reevaluate the grouping, and thus the ordering).

The fourth approach is to use a projection method, such as multidimensional scaling (MDS) or the algorithm disclosed in C. Faloutsos et al., "FastMap: A fast algorithm for indexing, data-mining and visualization of traditional and multimedia data sets," Proceedings of the 1995 ACM SIGMOD International Conference on Management of Data (San Jose, Calif.) pp. 163–174, May 1995, the disclosure of which is incorporated by reference herein. There is a fundamental limitation associated with the objectives of these techniques. MDS produces a low-dimensional visual representation of the data that preserves the distances between the original data points (with respect to the similarity function) as faithfully as possible. The problem is that for visual exploration purposes, one usually does not know in advance what one is looking for, and does not have a good similarity function. Therefore, preserving the distances with respect to a specific similarity function should not be a goal in itself, rather the order should be consistent with a reasonable similarity function. That is, if the point u is more similar to v than to w, then u should be mapped closer to v than to w in the order; however, preserving the actual ratio of the similarities should not be a goal. In other words, it would be more desirable to have the order be topology-preserving rather than distance-preserving (with distance being measured with respect to some specific similarity function). Moreover, MDS is prohibitively expensive for large data sets and does not allow for incrementally mapping new points to existing projections (once a new point is added, the entire mapping basically has to be recomputed).

SUMMARY OF THE INVENTION

The present invention provides techniques for ordering categorical attributes so as to better visualize data. In a first aspect of the invention, a computer-based technique of ordering categorical values of one or more attributes associated with a data set comprises the following steps/operations. First, the categorical values to be ordered are obtained. Given these categorical values, the task of ordering the categorical values is then formulated as a continuous optimization ordering problem. Once the task is formulated as a continuous optimization ordering problem, at least one continuous (preferably optimal) ordering solution to the continuous optimization ordering problem is computed. The technique may also include mapping the computed continuous ordering solution from a continuous space to a discrete space. At least a portion of the computed continuous ordering solution may be made available for use in accordance with a data visualization system.

In one embodiment, the step/operation of forming a task to order the categorical values as a continuous optimization ordering problem may comprise computing a similarity matrix based on the categorical values of the one or more attributes. The similarity matrix may be based on one or more multi-set operations. The one or more multi-set operations may comprise computing two types of similarity measurements, a first type being a similarity measure computed between two categorical values from the same attribute, and a second type being a similarity measure computed between two categorical values from different attributes. Further, the step/operation of forming a task to order the categorical values as a continuous optimization ordering problem may further comprise computing a Laplace matrix from the similarity matrix. Then, the step/operation of computing at least one continuous ordering solution to the continuous optimization ordering problem may comprise finding the smallest positive eigenvalue of the Laplace matrix, followed by obtaining a corresponding optimal eigenvector from the smallest positive eigenvalue of the Laplace matrix. The categorical values may then be ordered in accordance with corresponding values associated with the optimal eigenvector.

In a second aspect of the invention, techniques for ordering categorical values relating to multiple attributes are provided. In accordance with such techniques, prior to forming a task to order the categorical values as a continuous optimization ordering problem, the categorical values relating to the multiple attributes are mapped into a set of objects such that the above forming and computing steps/operations are performed in association with the set of objects.

In a third aspect of the invention, multi-level framework techniques for ordering categorical values of one or more attributes associated with a data set comprise the following steps/operations. First, the categorical values to be ordered are obtained. Given these categorical values, the categorical values are modeled as an original graph structure with vertices being the categorical values to be ordered and the weight of an edge representing the similarity of connected vertices. The original graph structure is then approximated by a hierarchical sequence of one or more coarser graph structures, wherein vertices that have a similarly local structure are merged into a vertex in a coarser graph structure. The coarsest graph structure is ordered in accordance with a continuous optimization ordering operation. The ordering of the coarsest graph structure is propagated back through to the original graph structure, and at least a portion of the propagated ordering associated with the original graph structure is made available for use in accordance with a data visualization system.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
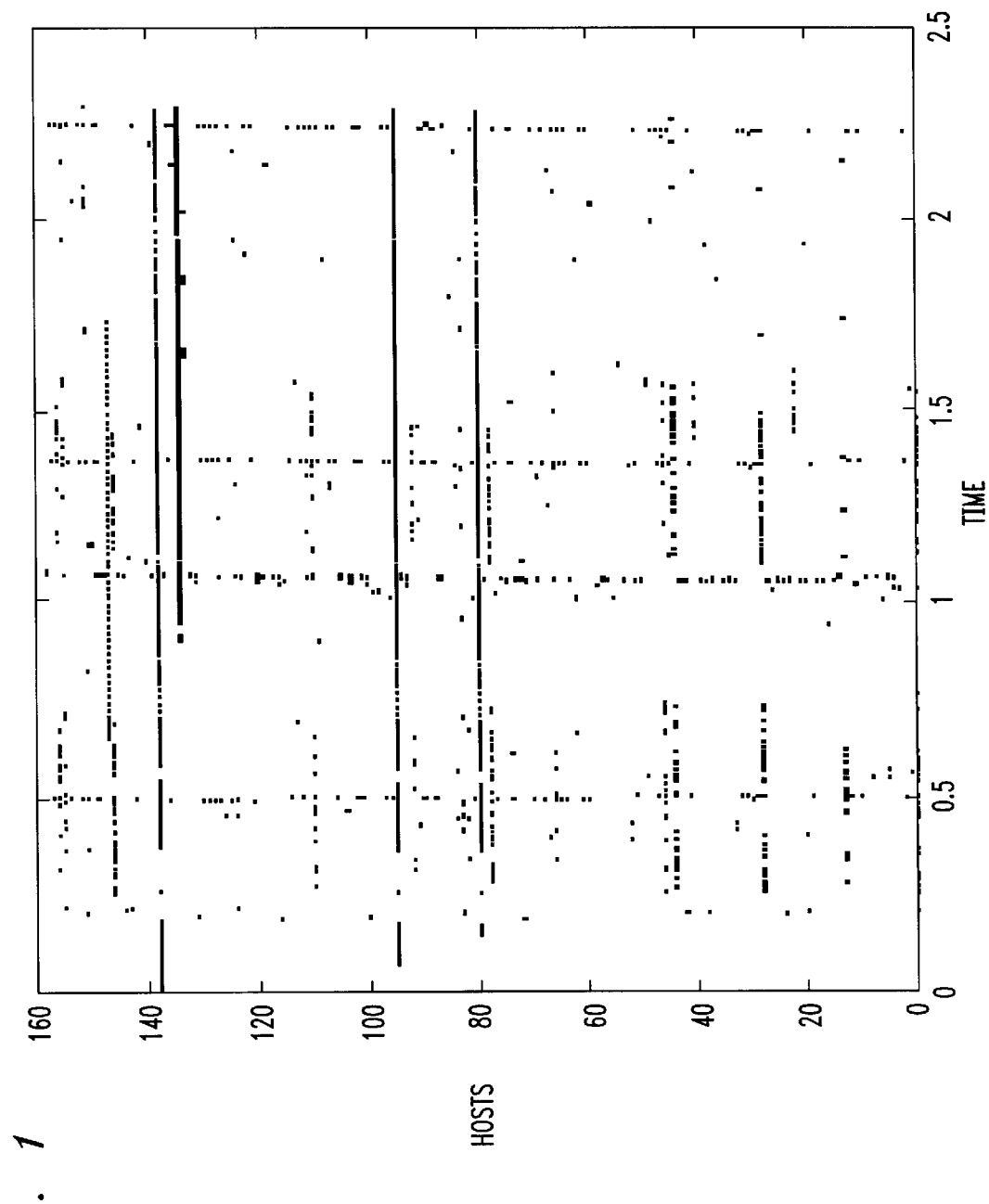
FIG. 1 illustrates a scatter plot where the y-axis represents host ids (identifiers), the x-axis represents time, and host ids are assigned randomly.

The present invention provides techniques for ordering categorical attributes so as to better visualize data. In so doing, the present invention, as will be illustratively explained below, may be thought of as focusing on the following three issues.

(1) How to develop fast, yet effective algorithms. The problem of ordering categorical data can be formulated as a combinatorial optimization problem, which is an NP-hard problem. This implies that the optimal solution is not likely to be obtained within polynomial time. As results, most research efforts relied on combinatorial heuristics that only give near-optimal solutions. For example, the previous Ma and Hellerstein work reduced the ordering problem to a Hamiltonian Path problem, and used a greedy heuristic to find an approximation to the Hamiltonian path, which in turn defined an ordering. However, a heuristic algorithm may be either too inefficient or not provide the best solution (typically, there is a tradeoff between the run-time of an algorithm and the closeness of approximation found by the algorithm). Other research efforts have proposed local improvement techniques, e.g., the dynamic systems approach in the above-referenced Gibson work, force-directed placement, etc. While such search strategies typically manage to capture many interesting connections and patterns in relatively small graphs, there is no adequate theoretical understanding of these strategies. At best, there are some theoretical analyses of special cases, but no general theory has yet been developed. It is notoriously hard to reason about the quality of the ordering and the time that takes the algorithms to converge. All of these make it hard to obtain any approximation guarantee. In accordance with the present invention, we formulate the ordering problem in a fundamentally different way that allows to avoid intractable combinatorial formulations.

(2) How to order data with multiple categorical attributes. Often, data in real life has multiple categorical attributes. For example, a system event has at least two categorical attributes: event type and host name. Visualization techniques, such as 3-dimensional scatter plots, and parallel coordinate graphs, enable us to explore multidimensional data. Clearly, using these techniques for effectively visualizing more dimensions requires ordering the corresponding categorical attributes.

(3) How to scale-up the ordering algorithm in order to handle a large amount of data. Today, it is not uncommon that a large volume of data is stored in a database. This provides valuable opportunity for discovering information. However, handling a large amount of data presents a great challenge of developing an efficient algorithm that scales linearly with respect to data. Algorithms designed for small sized data may break down when analyzing a large amount of data.

The present invention provides a new approach for ordering categorical data that addresses these three issues, as well as others.

To obtain an efficient, yet effective algorithm, we develop a different approach so as to avoid the combinatorial complexity of previous formulations. One key idea of the present invention is to formulate the ordering problem as a continuous optimization problem. Thus, the ordering algorithm of the invention may comprise three steps: (a) translating the discrete ordering problem to a continuous optimization problem; (b) solving the continuous optimization problem; and (c) mapping an optimal continuous solution to the closest discrete solution. To achieve (a), we relax the discreteness constraint in the corresponding discrete formulation. That is, instead of finding the best ordering, we aim at finding the best continuous mapping that maps original categorical values to real numbers. Step (b) solves the continuous optimization problem obtained in (a).

We will illustrate, in embodiments below, that the continuous optimization that we formulate has a special structure that makes it tractable, although the original discrete problem is NP-hard. This enables us to develop a spectral algorithm that gives the optimal solution. For instance, our algorithm uses spectral (algebraic) information about certain matrices derived from a graph representation of the data. Our algorithm generalizes the algebraic tools developed for the graph partitioning problem in W. E. Donath et al., "Algorithms for partitioning graphs and computer logic based on eigenvectors of connection matrices," IBM Technical Disclosure Bulletin 15 (1972), no. 3, pp. 938–944; and M. Fiedler, "Algebraic connectivity of graphs," Czecheslovak Mathematical Journal 23 (1973), no. 98, pp. 298–305, the disclosures of which are incorporated by reference herein, in a way that can be used to solve the ordering problem.

Lastly, after we obtain the continuous solution, step (c) maps the continuous values to the discrete space. We note that even though the solution to the continuous problem is optimal, mapping it to the closest discrete point does not necessarily give the optimal discrete solution (although it provides a good approximation). However, we note that the problem of constructing an order of a data set is fundamentally different from constructing a partitioning: the relaxation provides a valuable visualization interesting in its own right; hence, mapping a continuous solution back to the discrete space is not mandatory.

Now, we discuss how to generalize the aforementioned algorithm for dealing with multiple attributes. Real life data often has multiple attributes. Many visualization techniques have been developed to explore the relationship of the values of multiple attributes. For example, 3-dimensional scatter plots allow to draw three dimensions. A parallel plot uses a series of parallel axes, each of which represents a single attribute domain. A straight line segment connecting values on consecutive axes indicates that the data set has at least one entry containing both of these values (as the values of the corresponding attributes). The ordering problem comprises mapping attribute values on the axes in such a way that improves the visualization (typically, the objective is to minimize the number of edge crossings). Note that the situations here are complicated by the fact that there are two or more categorical attributes that need to be ordered simultaneously so that not only an order of each attribute has to be satisfactory by itself, but also the order must be satisfactory with respect to each other. Instead of ordering each attribute domain independently, the present invention creates a "heterogeneous" linear ordering that represents a mapping of the values of all attribute domains to values in a single line. This advantageously resolves the issue of keeping all the orderings in synchronism with each other. To obtain a mapping of the values of a specific attribute domain, the present invention takes the corresponding entries in the heterogeneous mapping (the heterogeneous mapping splits into homogeneous mappings).

Although a spectral algorithm generally produces high-quality orderings, it may be more expensive than other methods. For sparse matrices, the Lancoz iteration solves the symmetric eigenvalue problem in expected $O(n^{1.4})$ time. In practice, it may be slow for an extremely large data set. Furthermore, the graph from a real large data set is usually highly overdetermined, i.e., it may contain multiple vertices with almost identical adjacency structures. To scale-up our algorithm to deal with a large amount of data, we develop a multi-level ordering framework for the graph partition problem. The general idea is to approximate the original graph by a sequence of smaller, coarser ones. A-next-level-coarser graph is formed by collapsing all the vertices with similar adjacency structures into a single multi-vertex. The coarsest graph is ordered. The resulting order is then propagated back to the original graph by interpolating through the sequence of intermediate graphs (and refining the ordering as we uncoarse it). In doing so, we linearly decrease the size of the graph, and thus get great savings in time.

In summary, our invention provides techniques for ordering categorical data which comprise one or more of the following: (1) an efficient spectral algorithm for solving the ordering problem; (2) new techniques for handling multiple categorical attributes; and (3) a general hierarchical scheme for scaling the algorithms to very large data.

We note that another appealing feature of the invention is that since numerical analysts find eigenvectors for a living, there is a lot of software readily available for use in doing so, e.g. ESSL library from IBM Corporation.

This following portion of the detailed description provides an explanation of illustrative embodiments of the present invention. First, the ordering issue is described in terms of a visualization system, and then illustrative algorithms for implementing the present invention are described in detail.

Figure 2A:
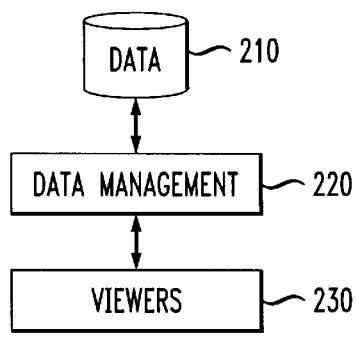
FIG. 2A is a block diagram illustrating a generic visualization system.

FIG. 2A depicts a generic visualization system such as, for example, the system described in the above-referenced U.S. patent application identified by Ser. No. 09/359,874, filed on Jul. 27, 1999, and entitled "Systems and Methods for Exploratory Analysis of Data for Event Management," the disclosure of which is incorporated by reference herein, embodiments of which are also referred to as an "Event-Browser." The visualization system has three main components: a data source 210, a data management module 220, and viewers 230. The data source stores data to be visual- ized. The data management module provides basic data query operations, maintenance in-memory data, and provides correspondence among viewers. A viewer provides a mechanism for visualizing data using a predefined approach, such as visualization techniques (e.g., scatter plot), summarization techniques, etc. A viewer is also responsible for interacting with an end-user.

Figure 2B:
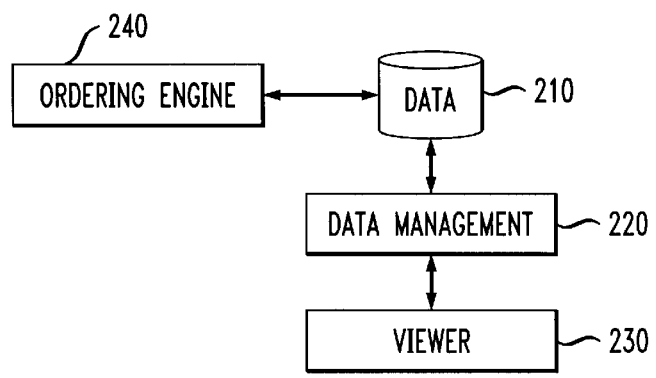
FIG. 2B is a block diagram illustrating a system using an ordering mechanism according to the invention as a part of data preprocessing.
Figure 2C:
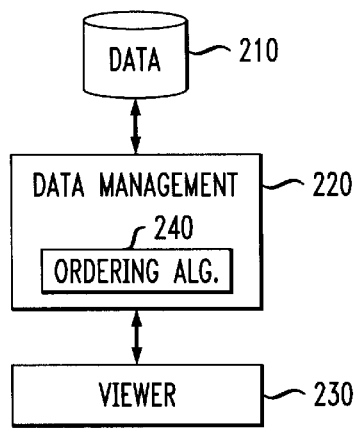
FIG. 2C is a block diagram illustrating a system using an ordering mechanism according to the invention as a part of data management.
Figure 2D:
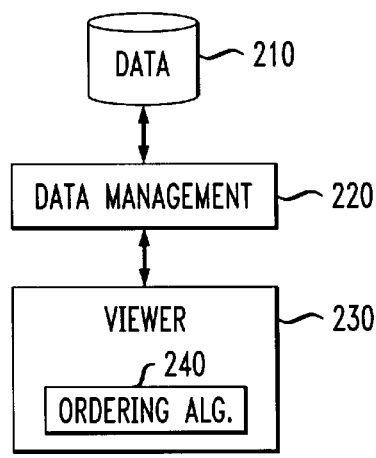
FIG. 2D is a block diagram illustrating a system using an ordering mechanism according to the invention as a part of a viewer.

FIGS. 2B, 2C, and 2D show three visualization systems in which the ordering techniques of the invention may be employed in different ways. That is, an ordering algorithm or engine which employs the methodologies of the invention, as will be explained in detail below, may be implemented in different locations in a visualization system in order to yield different advantages.

FIG. 2B illustrates that an ordering mechanism or ordering engine 240 of the invention may be used as a part of the data preprocessing phase of the visualization system. That is, the ordering engine operates on the data in the data source 210 prior to use by the data management module 220 and viewers 230. One advantage of such a system is that the ordering mechanism is transparent to the visualization system so that an existing visualization system does not need to be changed to use the ordering mechanism. This implementation is well suited to those applications in which data is well-understood and relatively stable. That is, the process for analyzing the data is fixed so that similar reports may be generated and use the same ordering algorithms every time.

FIG. 2C illustrates a system in which the ordering engine (algorithm) 240 of the invention is incorporated as a part of the data management module 220 of the visualization system. This implementation adds more flexibility to use ordering algorithms because multiple ordering algorithms can be supported for multiple viewers, and ordering can be done on-the-fly.

FIG. 2D illustrates a system in which the ordering engine 240 is implemented as part of a viewer 230. This implementation does not require any change of the data management module 220. In addition, this system makes it easy to tailor an ordering algorithm to meet specific needs of a user (or an application) by simply creating a special viewer.

In summary, FIGS. 2B, 2C, and 2D show three different ways to implement the ordering mechanism of the invention with a visualization system. It is to be appreciated that choosing which system implementation to use largely depends on the application.

We now turn to a detailed description of the ordering algorithms of the invention. First, we formally state the problem, and present a basic spectral algorithm for ordering. Then, we discuss how to handle multiple categorical attributes. Lastly, we develop a multi-level scheme for handling a large amount of data.

To begin with, we introduce some notations. Let $\{o_1, o_2, \ldots, o_n\}$ represent n objects to be ordered. Let $s(i,j)$ represent the similarity of objects $o_i$ and $o_j$. The ordering problem comprises finding a permutation $\pi$ of $\{1, \ldots, n\}$ to minimize $\Sigma_{i,j} s(i,j)(\pi(i)-\pi(j))^2$.

Clearly, this optimization function encourages placing similar objects in close positions. That is, if two objects are similar, i.e., $s(i,j)$ is large, then these two objects should be placed in close positions, i.e., $(\pi(i)-\pi(j))^2$ is small. We note that the above formulation is a discrete optimization issue, and is an NP-hard problem. This implies that the optimal solution is not likely to be obtained in polynomial time. Thus, the present invention provides for translating this discrete optimization problem into a continuous optimization problem by finding a real placement $\{x_1, \ldots, x_n\}$ so as to minimize $\Sigma_{i,j} s(i,j)(x(i)-x(j))^2$ subject to the normalization constraint $\Sigma_i x(i)^2 = 1$.

Here, $x_i$, a real number, is the placement of the object $o_i$. Once we obtain the optimal placement vector $X=\{x_1, \ldots, x_n\}$, we can then order the objects by the corresponding x coordinate. Notice that the objective function can be rewritten as a minimization of $X^T L X$ subject to $X^T X = 1$, where $L=D-S$. It is to be understood that $X^T$ represents the transpose of the optimal placement vector X, while L represents a Laplace matrix. The matrix D is a diagonal n×n matrix with elements $d_{ii} = \Sigma_j s(i,j)$ and S is an n×n similarity matrix. It is to be understood that s(i, j) represents the element at the i-th row and j-th column of similarity matrix S. It has been shown that the solution of this continuous placement problem is the eigenvector of the Laplacian matrix associated with the smallest positive eigenvalue, see, e.g., K. M. Hall, "An r-dimensional quadratic placement algorithm," Management Science 17 (1970), no. 3, pp. 219–229, the disclosure of which is incorporated by reference herein.

Figure 3A:
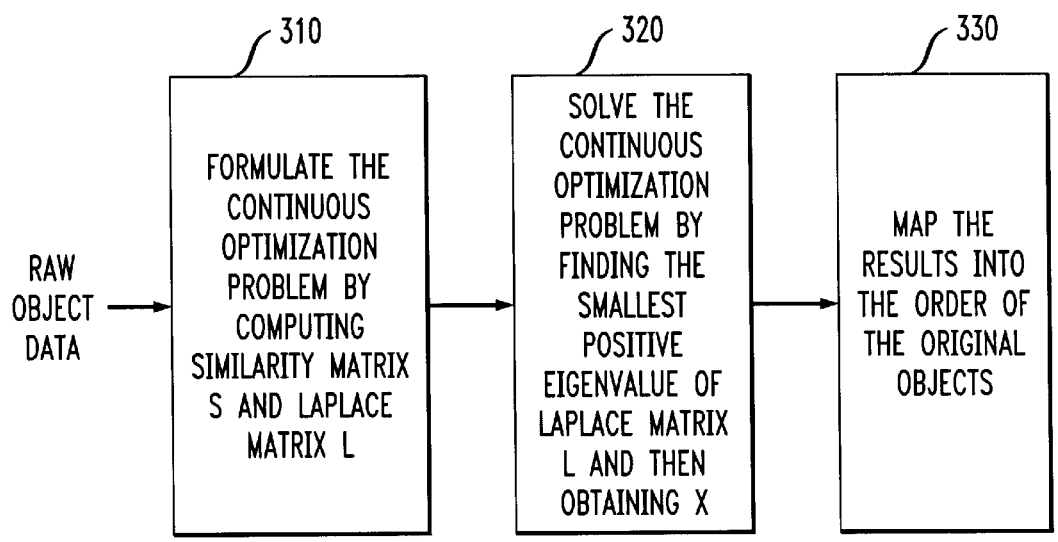
FIG. 3A is a flow diagram illustrating a spectral algorithm for ordering according to one embodiment of the present invention.

With the above background, we describe an illustrative spectral algorithm for ordering according to an embodiment of the invention. The algorithm is summarized in FIG. 3A. It is to be understood that raw object data serves as the input to the algorithm. This raw data may be a data set such as the one previously described above, e.g., a data set containing over 10,000 events generated by 160 hosts with 20 event types over a three-day period, where the host names are the objects to be ordered or mapped.

First, in step 310, the discrete ordering problem is translated to a continuous optimization problem. That is, step 310 formulates the problem as a continuous optimization problem by computing the similarity matrix S and the Laplace matrix L. Illustrative methods for computing the similarity matrix S will be described below. The Laplace matrix L may be computed in accordance with the relationship described above, L=D−S, with D being defined as a diagonal n x n matrix with elements $d_{ii} = \Sigma_j s(i,j)$ such that D is computed from S.

Next, step 320 solves the continuous optimization problem. This is done by finding the smallest positive eigenvalue of L and then obtaining the corresponding optimal eigenvector X It is to be understood that the corresponding optimal eigenvector may be obtained in any conventional manner known to those ordinarily skilled in the art. Step 330 then orders the objects by the corresponding x value associated with the optimal eigenvector X. That is, the new order of objects is $\{o_{i1}, o_{i2}, \ldots o_{in}\}$, where $x_{i1} \leq x_{i2} \leq \ldots \leq x_{in}$. Thus, the results are mapped into the order of the original objects.

Figure 3B:
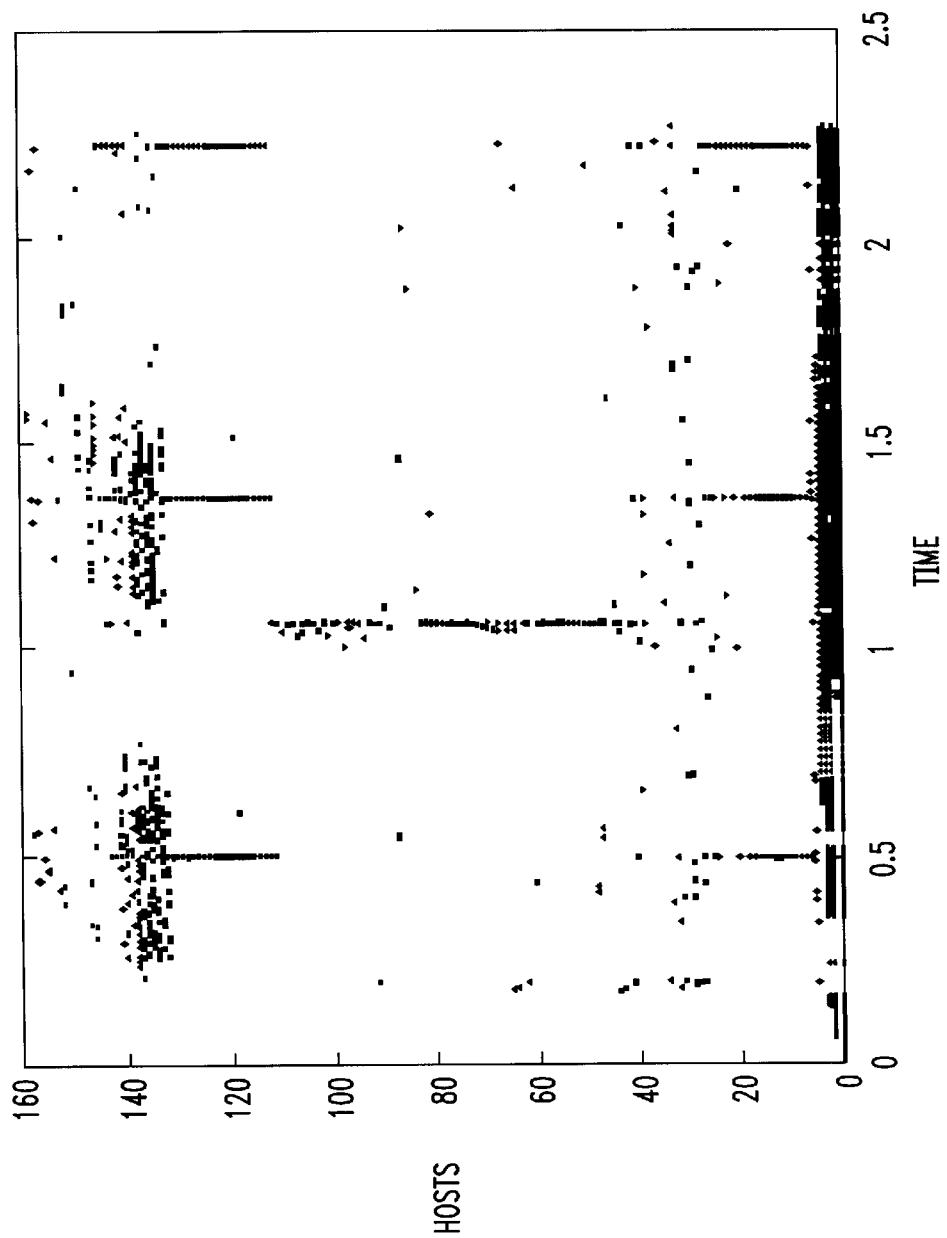
FIG. 3B illustrates a scatter plot where the y-axis represents host ids (identifiers), the x-axis represents time, and host ids are assigned in accordance with a spectral algorithm for ordering according to one embodiment of the present invention.

FIG. 3B illustrates the results of the application of the above ordering algorithm to the same data set that is visualized in the scatter plot of FIG. 1. Again, our goal is to arrange hosts on the y-axis. The x-axis is time. The dot at coordinate (x, y) in the figure represents an event generated by the y-th host at time x. While both FIG. 1 and FIG. 3B represent the same data set, each uses a different order of hosts. The order of hosts in FIG. 1 is assigned randomly; whereas the order of hosts in FIG. 3B is determined in accordance with the ordering algorithm described in FIG. 3A. As is evident, FIG. 3B provides more information about the data. For example, the ordering in FIG. 3B shows patterns (e.g., as depicted by the cloud-like groupings at the top of the scatter plot) and different behaviors of hosts, thus providing a higher quality visualization of the event data.

Figure 4:
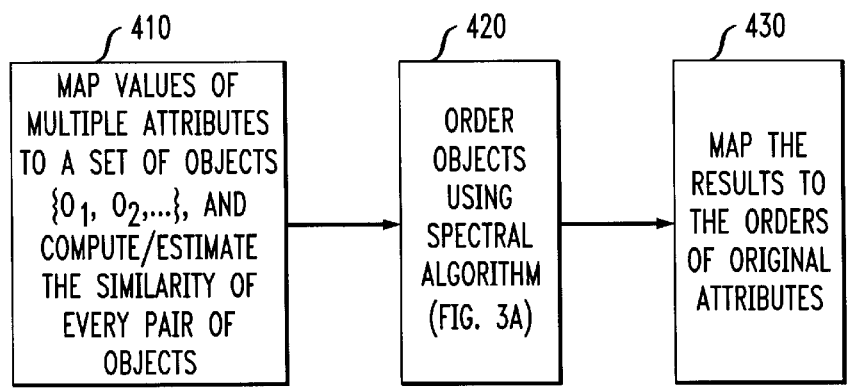
FIG. 4 is a flow diagram illustrating a spectral algorithm for ordering which handles multiple attributes according to one embodiment of the present invention.

We now illustrate how to order multiple categorical attributes in accordance with one embodiment of the present invention. Here, the present invention creates a 1-to-1 mapping of the values of all the attributes to a single set of objects. For example, say we have two attributes A and B. A has two values: $a_1$ and $a_2$. B has two values: $b_1$ and $b_2$. Now, we can map $a_1$ to $o_1$, $a_2$ to $o_2$, $b_1$ to $o_3$, and $b_2$ to $o_4$, where $\{o_1, o_2, o_3, o_4\}$ is a set objects. This way, we reduce the problem of ordering the values of multiple attributes to the problem of ordering a single set of objects. After the set of objects is ordered using the spectral algorithm described above in the context of FIG. 3A, the ordering of objects is then mapped to the ordering of the values of the corresponding attributes. Suppose that we find that an optimal ordering in the previous example is $\{o_3, o_2, o_4, o_1\}$. The values of attributes A and B are then ordered as $\{a_2, a_1\}$ since $o_2$ is in front of $o_1$; likewise for $\{b_1, b_2\}$. FIG. 4 details this procedure. As shown, step 410 maps the values of each attribute to objects and computes the similarity measures for every pair of objects. In step 420, the method runs the spectral algorithm for ordering (FIG. 3A) and obtains an ordered set of objects. Step 430 maps back the results to each attribute.

In accordance with the present invention, objects to be ordered correspond to one or more categorical attribute values. To use the aforementioned algorithms, we need to define the similarity measurement of any two categorical attribute values. The previous Ma and Hellerstein work discussed how to measure similarity of categorical values for event data based on its temporal information. The present invention develops a similarity measurement based on multi-set operations. Assume, for example, our data has k attributes: $A_1, \ldots, A_k$, whose domains are $D_1, \ldots, D_k$. Clearly, we need to define two types of similarity measurements: (1) intra-attribute similarity; and (2) inter-attribute similarity. The former measures the similarity between two categorical values from the same attribute; the latter measures the similarity between two values from two different attributes. To obtain inter-attribute similarity, let $\psi^i_x = \{d \in D | d_i = x\}$ be a set of data whose i-th attribute has value x. The inter-attribute similarity, $S(u_i, v_j)$, where $u \in D_i$ and $v \in D_j$, can be computed by $$S(ui, j) = \frac{|\psi^i_u \cap \psi^j_v|}{\frac{1}{2}(|\psi^i_u| + |\psi^j_v|)}.$$

Similarly, to obtain intra-attribute similarity, let $\theta^i_x = \{(d_j)_{j \neq i} | d_i = x, d \in D\}$. The intra-attribute similarity, $S(u_i, v_i)$, where $u_i$ and $v_i$ are two values from the i-th attribute, can be defined by $$S(u_i, v_i) = \frac{|\theta_u \cap \theta_v|}{1/2(|\theta^i_u| + |\theta^i_v|)}.$$

We now discuss how to handle a large amount of data in accordance with an illustrative multi-level framework according to the invention. To illustrate our multi-level spectral algorithm for ordering, we model the data as a sparse heterogeneous graph with vertices being categorical values to be ordered. The weight of an edge represents the similarity of the connected vertices (intra-attribute similarity measure, if the connected vertices belong to the same attribute domain; and inter-attribute otherwise). The present invention orders a large original graph by a multi-level strategy. That is, we approximate the original graph by a sequence of smaller, coarser ones. A set of vertices that have a similarly local structure are merged into a vertex in the coarser graph. The coarsest graph is then ordered and the ordering is propagated upwards to the original graph, by interpolating through the sequence of intermediate graphs in such a way that preserves the coarse graph ordering. Doing so requires extending the base algorithm of the invention to vertex-weighted graphs, in which a vertex may represent a set of vertices in the original graph.

Assume, for example, the i-th vertex of a coarser graph represents $w_i$ vertices of the original graph. A natural way of extending the algorithm to graphs on multi-vertices is to incorporate $w_i$'s into the constraint of the optimization problem. The modified optimization problem can be stated as follows: minimize $X^T L X$, subject to $W X^T W X = 1$, where W is a diagonal matrix with $w^2_i$, and $w_i$ is the number of vertices of the original graph represented by the multi-vertex i in G. Compared to the original formulation, the above optimization changes the constraint to $\Sigma i(w_{ix_1})^2 = 1$. It can be shown that the optimal solution of the above optimization problem is the first non-zero eigenvector of $L^1$, where $L^1 = W^{-1} L$.

A problem with the original, above-referenced K. M. Hall algorithm, as applied to real data sets, is that the original K. M. Hall algorithm produces orderings that suffer from a strong agglomeration of points, especially around the origin. This is because the eigenvectors used in the construction typically have a few large components because of the normalization constraint. This forces the rest of the coordinates to be close to zero, and thus leads to highly cluttered regions of the visual space. Consequently, choosing the eigenvector corresponding to the smallest non-zero eigenvalue will not necessarily produce good visualizations. Thus, the present invention provides a modification that avoids such a degeneracy by imposing two structural restrictions when selecting an eigenvector. The first constraint requires all elements of the selected eigenvector to be larger than a user-defined threshold, e.g., 0.05, which is a function of the size of the data set. The second constraint requires that the difference between any two elements of the selected eigenvector is larger than a user-defined threshold, e.g., 0.1. These two constraints basically stipulate that the placement vector has to be interesting in an information-theoretic sense, i.e., must have high min-entropy.

Figure 5:
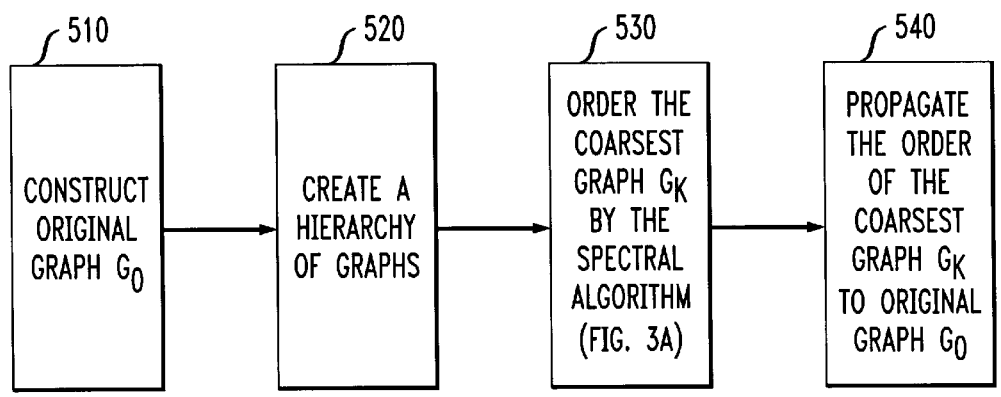
FIG. 5 is a flow diagram illustrating a multi-level spectral algorithm for ordering which handles large data sets according to one embodiment of the present invention.

FIG. 5 illustrates a flow diagram of a multi-level ordering algorithm according to an embodiment of the invention. As shown, the algorithm comprises four steps.

In step 510, the algorithm constructs a heterogeneous graph $G_0$ of categorical values to be ordered. The nodes of the heterogeneous graph represent categorical values. The edge represents the similarity measure of two connected nodes.

In step 520, the algorithm creates a hierarchy of graphs $G_0, G_1, \ldots, G_k$ (starting from the original graph $G_0$) by coalescing a set of vertices of $G_i$ in a new node called multi-vertex, whose weight is the number of original nodes it represents, in a coarser graph $G_{i+1}$. $G_{i+1}$ then acts as the input graph for another iteration of graph coarsening. This coarsening phase is completed when a sufficiently small graph is obtained, e.g., when a graph size of 100 nodes or less is reached.

In step 530, the algorithm orders the smallest (coarsest) graph in the hierarchy (denoted above by $G_k$) using the spectral algorithm (FIG. 3A) for multi-vertices described above.

In step 540, the algorithm propagates or interpolates the ordering of $G_k$ back to $G_0$ through a sequence of intermediate graphs, refining the ordering as the algorithm proceeds.

There are several reasons why the multi-level algorithm described above works well. First, the coarsening phase hides all unimportant redundant details of the graph, and preserves only the most crucial connectivity information about the data. This allows to find a good initial order that can be iteratively refined as the result is propagated back to the original graph. A second reason is that this multi-level approach significantly speeds up the computation since the order is computed on a graph which is much smaller than the original graph. This makes the algorithm scaleable to very high volumes of data. In fact, the time needed to order the coarsest graph becomes just a minor consideration, and thus a system implementing this approach can afford to use even expensive (but very effective) ordering algorithms. Finally, a multi-level refinement (during the last uncoarsening phase) improves the quality of the initial ordering. Basically, the spectral algorithm of the invention takes a global view of a graph and quickly finds a good initial order, and then this order is locally refined as it is projected back to the original graph. Thus, this approach combines the strength of both global and local techniques by working with the graph at different levels of granularity.

In the following description, we further describe how steps 520 and 540 of the above algorithm may operate. There is a variety of choices for each step. We discuss only some of them. The actual choice can be best determined by an application. Given the teachings herein, one skilled in the art will appreciate other implementations.

During the coarsening phase, subsets of vertices with highly similar adjacency structures are recursively merged together into multi-vertices of the next level coarser graph. This coarsening scheme is motivated by the fact that real data sets are highly overdetermined, in which multiple vertices may have almost identical connectivity. As a rule of thumb, the number of vertices decreases by a factor of one-third during each round of coarsening. This ratio clearly shows how much redundancy is initially contained in the data. The similarity of adjacency structures of two vertices can be measured as the Euclidean distance between their normalized adjacency vectors (i.e., between the corresponding rows of the similarity matrix of the graph). During each coarsening, a set of vertices with pairwise similarity greater than a certain threshold is combined into a multi-vertex. The weight of a multi-vertex is set to be the sum of the weights of the vertices it contains. The weights of the vertices of the original graph are set to one. The weight of the edge connecting two multi-vertices A and B is set to be the sum of the weights of all the edges going from some vertex in A to some vertex in B (note that the weights of the resulting coarser graph have been renormalized). This guarantees that the connectivity of the coarser graph is inherited from the connectivity of the finer graph. As a result, the coarsest graph preserves many important connectivity properties of the original graph. A naive approach to finding subsets of vertices to be merged together is to compute a similarity matrix of every graph in the sequence. Clearly, this approach is computationally expensive (only computing the similarity matrix of the initial graph takes $O(n^2)$ time). The present invention computes the subsets using a randomized algorithm that approximates highly connected components of a graph. Several such randomized algorithms are known in matching theory, computer vision, etc. In one illustrative implementation, we use a variation of the heavy clique matching algorithm implemented by Karypis et al. in graph partitioning, see G. Karypis et al., "Multilevel hypergraph partitioning: Applications in VLSI domain," Tech. report, University of Minnesota, Department of Computer Science, 1997, short version in 34th Design Automation Conference, the disclosure of which is incorporated by reference herein.

Once the order of nodes in the coarsest graph is constructed by the spectral algorithm described above, the order is propagated back to the original graph through the sequence of intermediate graphs. In general, the order of the next level finer graph has to respect the order of the coarser graph. Since the vertices of the coarser graph are just multi-vertices of the next level finer graph, projecting one level back simply reduces to ordering the vertices within each multi-vertex. If a multi-vertex is large, a spectral algorithm can be used to order corresponding nodes of this multi-vertex. However, this ordering has to be constructed in the context of the rest of the graph. We found that the best results are achieved by combining the recursive application of the spectral algorithm with local refinement heuristics. One illustrative approach is to use a well-known Rayleigh Quotient Iteration.

Figure 6:
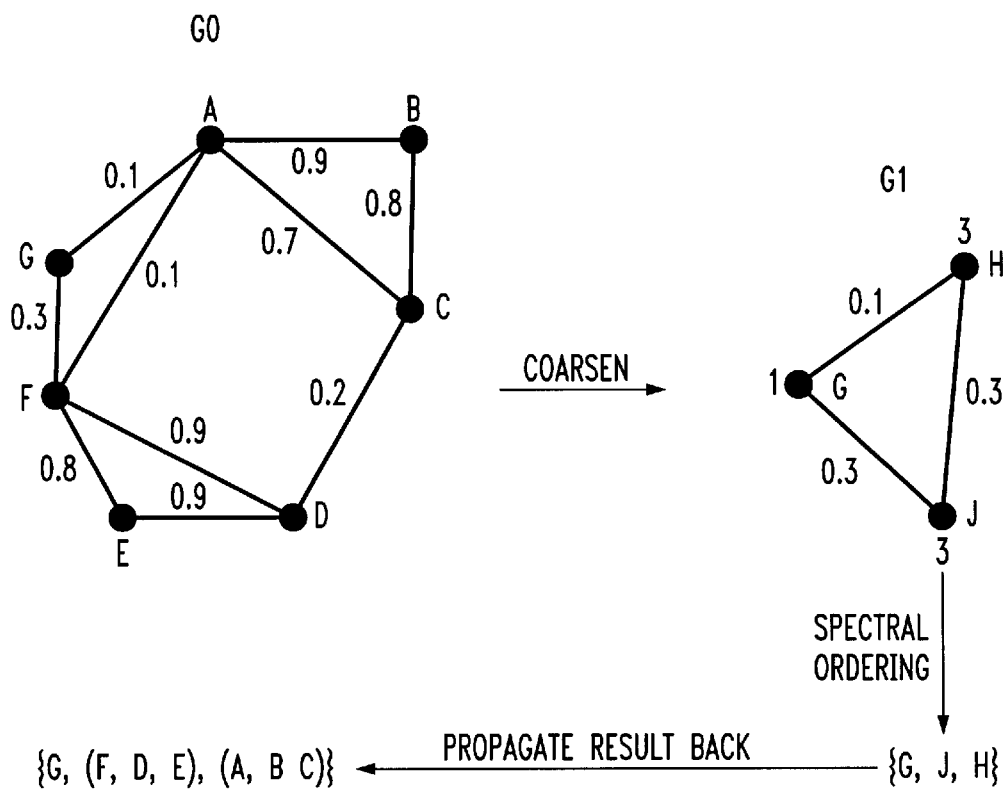
FIG. 6 is a diagram illustrating an example of results of a multi-level spectral algorithm for ordering according to one embodiment of the present invention.

FIG. 6 demonstrates the multi-level algorithm through an illustrative example. In this example, we need to order 7 objects {A, B, C, D, E, F, G}. The original graph G0 is drawn at the left hand side of the figure. A node represents an object to be ordered. An edge represents the similarity between two connected nodes. As discussed above, nodes that have similar local structures are merged into a multi-vertex in a coarse graph, e.g., graph G1. For example, {A,B,C} and {D, E, F} are merged into multi-vertices H and G, respectively. Then, we order the coarsest graph by the spectral algorithm with local heuristics. In this case, we obtain an order {G, J, H}. Lastly, we need to propagate this result back by expanding every multi-vertex. For our example, we need to further order {A, B, C} associated with H; and {D, E, F} associated with G. This can be done by applying the spectral algorithm of the invention. The final result is {G, F, D, E, A, B, C}.

It is to be appreciated that the actual choice of methods used to perform the coarsening and the refinement of the inventive ordering described above is application-dependent. Thus, given the teachings herein, one skilled in the art will realize various application-dependent implementations.

Figure 7:
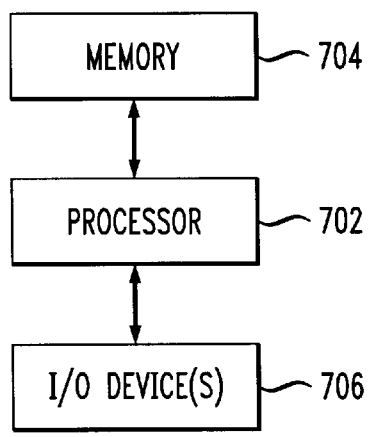
FIG. 7 illustrates an exemplary hardware implementation for use with one or more ordering algorithms according to the invention.

Referring now to FIG. 7, a block diagram illustrating an exemplary computer system for implementing one or more of the ordering algorithms of the invention is shown. The computer system may comprise a processor 702 operatively coupled to memory 704 and I/O devices 706. It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices (e.g., keyboard, mouse, etc.) for inputting data to the processing unit, and/or one or more output devices (e.g., CRT display. printer, etc.) for presenting results associated with the processing unit and/or a graphical user interface for an end-user. For example, the display may be where the end-user views a visualization generated in accordance with an ordering algorithm of the invention. It is also to be understood that "processor" may refer to more than one processing device and that various elements associated with a processing device may be shared by other processing devices.

Accordingly, software components (e.g., one or more programs) including instructions or code for performing the methodologies of the invention, as described herein, may be stored in one or more of the associated memory devices (e.g., ROM, fixed or removable memory) as an article of manufacture and, when ready to be utilized, loaded in part or in whole (e.g., into RAM) and executed by the processor. Thus, it is to be understood that the hardware implementation shown in FIG. 7 may preferably be used to implement the ordering engine 240 wherein one or more of the ordering algorithms of the invention may be employed, as well as the elements of a visualization system as shown in FIGS. 2A through 2D.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A computer-based method of ordering categorical values of one or more attributes associated with a data set, the method comprising the steps of:

obtaining the categorical values of the one or more attributes associated with the data set;

forming a task of ordering the categorical values of the one or more attributes associated with the data set as a continuous optimization ordering problem;

computing at least one continuous ordering solution to the continuous optimization ordering problem; and making at least a portion of the computed continuous ordering solution available for use in accordance with a data visualization system.

2. The method of claim 1, further comprising the step of mapping the computed continuous ordering solution from a continuous space to a discrete space.

3. The method of claim 1, wherein the step of forming a task to order the categorical values as a continuous optimization ordering problem comprises the step of computing a similarity matrix based on the categorical values of the one or more attributes.

4. The method of claim 3, wherein the similarity matrix is based on one or more multi-set operations.

5. The method of claim 4, wherein the one or more multi-set operations comprise computing two types of similarity measurements, a first type being a similarity measure computed between two categorical values from the same attribute, and a second type being a similarity measure computed between two categorical values from different attributes.

6. The method of claim 3, wherein the step of forming a task to order the categorical values as a continuous optimization ordering problem further comprises the step of computing a Laplace matrix from the similarity matrix.

7. The method of claim 6, wherein the step of computing at least one continuous ordering solution to the continuous optimization ordering problem comprises the step of finding the smallest positive eigenvalue of the Laplace matrix.

8. The method of claim 7, wherein the step of computing at least one continuous ordering solution to the continuous optimization ordering problem further comprises the step of obtaining a corresponding optimal eigenvector from the smallest positive eigenvalue of the Laplace matrix.

9. The method of claim 8, further comprising the step of, prior to making the solution available for use in accordance with the data visualization system, ordering the categorical values in accordance with corresponding values associated with the optimal eigenvector.

10. The method of claim 1, wherein the categorical values relate to multiple attributes and further comprising the step of, prior to forming a task to order the categorical values as a continuous optimization ordering problem, mapping the categorical values relating to the multiple attributes into a set of objects such that the forming and computing steps are performed in association with the set of objects.

11. The method of claim 1, wherein the obtaining, forming and computing steps are performed in association with a preprocessing operation of the data visualization system.

12. The method of claim 1, wherein the obtaining, forming and computing steps are performed in association with a data management module of the data visualization system.

13. The method of claim 1, wherein the obtaining, forming and computing steps are performed in association with a data viewer module of the data visualization system.

14. A computer-based method of ordering categorical values of one or more attributes associated with a data set, the method comprising the steps of:

obtaining the categorical values of the one or more attributes associated with the data set;

modeling the categorical values as an original graph structure with vertices being the categorical values to be ordered and the weight of an edge representing the similarity of connected vertices;

approximating the original graph structure by a hierarchical sequence of one or more coarser graph structures, wherein vertices that have a similarly local structure are merged into a vertex in a coarser graph structure;

ordering the coarsest graph structure in accordance with a continuous optimization ordering operation;

propagating the ordering of the coarsest graph structure back through to the original graph structure; and making at least a portion of the propagated ordering associated with the original graph structure available for use in accordance with a data visualization system.

15. Apparatus for ordering categorical values of one or more attributes associated with a data set, the apparatus comprising:

at least one processor operative to: (i) obtain the categorical values of the one or more attributes associated with the data set; (ii) form a task to order the categorical values of the one or more attributes associated with the data set as a continuous optimization ordering problem; (iii) compute at least one continuous ordering solution to the continuous optimization ordering problem; and (iv) make at least a portion of the computed continuous ordering solution available for use in accordance with a data visualization system.

16. The apparatus of claim 15, wherein the processor is further operative to map the computed continuous ordering solution from a continuous space to a discrete space.

17. The apparatus of claim 15, wherein forming a task to order the categorical values as a continuous optimization ordering problem comprises computing a similarity matrix based on the categorical values of the one or more attributes.

18. The apparatus of claim 17, wherein the similarity matrix is based on one or more multi-set operations.

19. The apparatus of claim 18, wherein the one or more multi-set operations comprise computing two types of similarity measurements, a first type being a similarity measure computed between two categorical values from the same attribute, and a second type being a similarity measure computed between two categorical values from different attributes.

20. The apparatus of claim 17, wherein forming a task to order the categorical values as a continuous optimization ordering problem further comprises computing a Laplace matrix from the similarity matrix.

21. The apparatus of claim 20, wherein computing at least one continuous ordering solution to the continuous optimization ordering problem comprises finding the smallest positive eigenvalue of the Laplace matrix.

22. The apparatus of claim 21, wherein computing at least one continuous ordering solution to the continuous optimization ordering problem further comprises obtaining a corresponding optimal eigenvector from the smallest positive eigenvalue of the Laplace matrix.

23. The apparatus of claim 22, wherein the processor is further operative to, prior to making the solution available for use in accordance with the data visualization system, order the categorical values in accordance with corresponding values associated with the optimal eigenvector.

24. The apparatus of claim 15, wherein the categorical values relate to multiple attributes and wherein the processor is further operative to, prior to forming a task to order the categorical values as a continuous optimization ordering problem, map the categorical values relating to the multiple attributes into a set of objects such that the forming and computing steps are performed in association with the set of objects.

25. The apparatus of claim 15, wherein the processor performs the obtaining, forming and computing steps in association with a preprocessing operation of the data visualization system.

26. The apparatus of claim 15, wherein the processor performs the obtaining, forming and computing steps in association with a data management module of the data visualization system.

27. The apparatus of claim 15, wherein the processor performs the obtaining, forming and computing steps in association with a data viewer module of the data visualization system.

28. Apparatus for ordering categorical values of one or more attributes associated with a data set, the apparatus comprising:

at least one processor operative to: (i) obtain the categorical values of the one or more attributes associated with the data set; (ii) model the categorical values as an original graph structure with vertices being the categorical values to be ordered and the weight of an edge representing the similarity of connected vertices; (iii) approximate the original graph structure by a hierarchical sequence of one or more coarser graph structures, wherein vertices that have a similarly local structure are merged into a vertex in a coarser graph structure; (iv) order the coarsest graph structure in accordance with a continuous optimization ordering operation; (v) propagate the ordering of the coarsest graph structure back through to the original graph structure; and (vi) make at least a portion of the propagated ordering associated with the original graph structure available for use in accordance with a data visualization system.

29. An article of manufacture for ordering categorical values of one or more attributes associated with a data set, comprising a machine readable medium containing one or more programs which when executed implement the steps of:

obtaining the categorical values of the one or more attributes associated with the data set;

forming a task to order the categorical values of the one or more attributes associated with the data set as a continuous optimization ordering problem;

computing at least one continuous ordering solution to the continuous optimization ordering problem; and making at least a portion of the computed continuous ordering solution available for use in accordance with a data visualization system.

30. An article of manufacture for ordering categorical values of one or more attributes associated with a data set, comprising a machine readable medium containing one or more programs which when executed implement the steps of:

obtaining the categorical values of the one or more attributes associated with the data set;

modeling the categorical values as an original graph structure with vertices being the categorical values to be ordered and the weight of an edge representing the similarity of connected vertices;

approximating the original graph structure by a hierarchical sequence of one or more coarser graph structures, wherein vertices that have a similarly local structure are merged into a vertex in a coarser graph structure;

ordering the coarsest graph structure in accordance with a continuous optimization ordering operation;

propagating the ordering of the coarsest graph structure back through to the original graph structure; and making at least a portion of the propagated ordering associated with the original graph structure available for use in accordance with a data visualization system.

* * * * *

UNITED STATES PATENT AND TRADEMARK OFFICE
CERTIFICATE OF CORRECTION

PATENT NO.    : 6,615,211 B2
DATED         : September 2, 2003
INVENTOR(S)   : A. Beygelzimer et al.

It is certified that error appears in the above-identified patent and that said Letters Patent is hereby corrected as shown below:

Column 10,
Line 42, replace the formula with $$S(u_i, v_j) = \frac{|\psi_u^i \cap \psi_v^j|}{\frac{1}{2}(|\psi_u^i| + |\psi_v^j|)}$$

Column 11,
Line 15, replace the sentences with
-- Compared to the original formulation, the above optimization changes the constraint to $\Sigma i (w_{ix_i})^2 = 1$. It can be shown that the optimal solution of the above optimization problem is the first non-zero eigenvector of $L'$, where $L' = W^{-1}L$. --

Signed and Sealed this

Second Day of December, 2003

JAMES E. ROGAN
*Director of the United States Patent and Trademark Office*